United States Patent [19]

Marazzi

[11] Patent Number: 4,805,551
[45] Date of Patent: Feb. 21, 1989

[54] PROCESS AND APPARATUS FOR PRODUCING GLAZED CERAMIC TILES, AND TILES SO OBTAINED

[75] Inventor: Filippo Marazzi, Sassuolo, Italy
[73] Assignee: Ceramica Filippo Marazzi S.p.A.
[21] Appl. No.: 99,479
[22] Filed: Sep. 22, 1987

Related U.S. Application Data

[62] Division of Ser. No. 816,751, Jan. 7, 1986, abandoned.

[30] Foreign Application Priority Data

Feb. 21, 1985 [IT]  Italy ............... 19589 A/85

[51] Int. Cl.⁴ ............................................. B05C 11/00
[52] U.S. Cl. ......................................... 118/64; 118/66; 118/312; 427/193; 427/314; 427/376.2
[58] Field of Search ............. 118/308, 312, 666, 66, 118/64; 427/193, 190, 314, 376.2

[56] References Cited

U.S. PATENT DOCUMENTS

| 1,539,833 | 6/1925 | Fahrenwald | 198/780 X |
| 2,347,535 | 4/1944 | Bair | 427/193 X |
| 2,962,381 | 11/1960 | Dobry et al. | 118/308 X |
| 3,014,812 | 12/1961 | Sallie | 118/308 X |
| 3,620,423 | 11/1971 | Dalgleish | 118/308 X |
| 3,908,591 | 9/1975 | Hall | 118/308 |
| 4,550,680 | 11/1985 | Derendinger | 118/308 |

FOREIGN PATENT DOCUMENTS

3319396 11/1984 Fed. Rep. of Germany ... 427/376.2

*Primary Examiner*—Shrive Beck
*Assistant Examiner*—Alain Bashore
*Attorney, Agent, or Firm*—Toren, McGeady & Associates

[57] ABSTRACT

The process provides for the firing in a furnace of ceramic bodies and their coating in an incandescent state on one face with dry granular or powdered glaze when all firing reactions of the ceramic bodies have substantially reached completion; a subsequent thermal treatment fires the glaze and gradually cools the tile.

The apparatus for carrying out the process provides for a furnace for firing ceramic bodies, the furnace being divided into two section between which is a device for distributing glaze over the ceramic bodies conveyed to pass through the furnace.

5 Claims, 1 Drawing Sheet

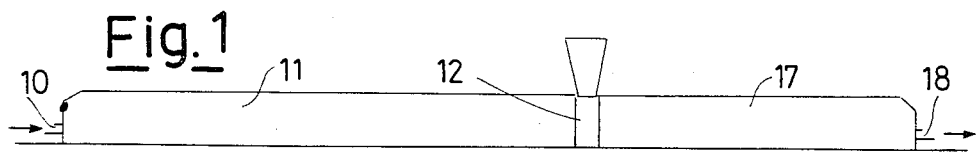
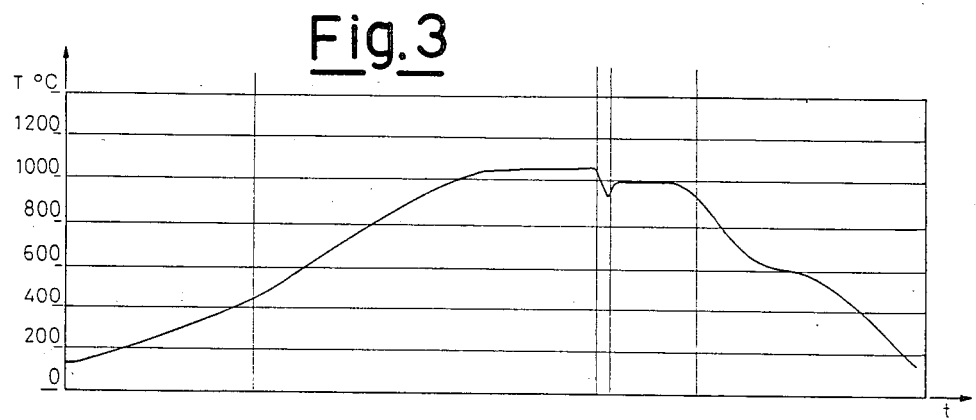
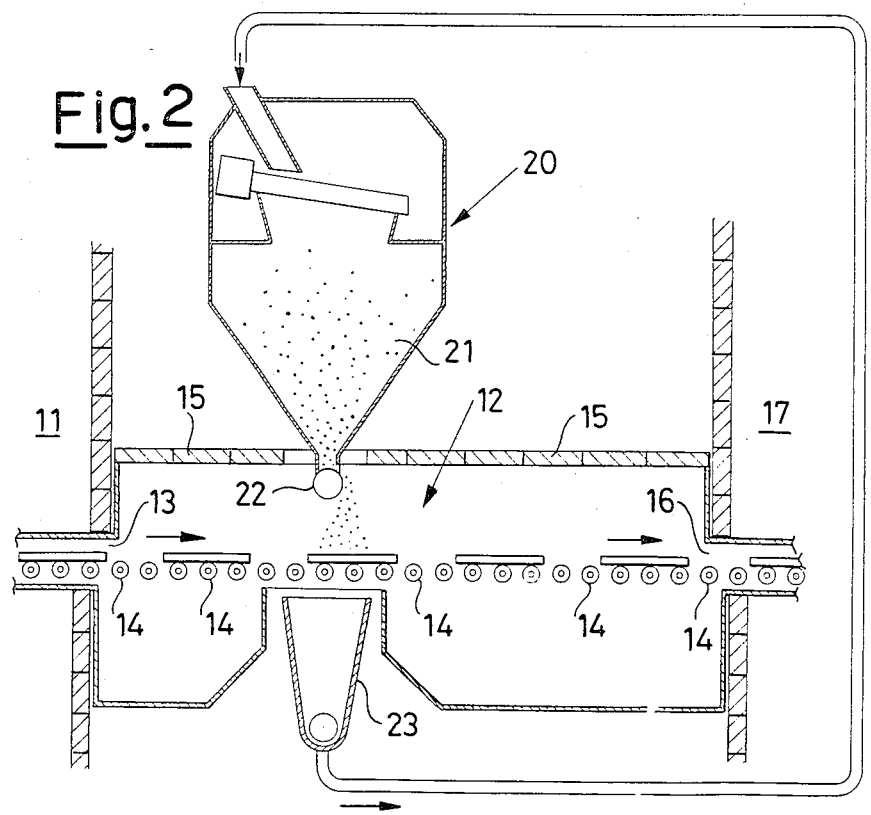

PROCESS AND APPARATUS FOR PRODUCING GLAZED CERAMIC TILES, AND TILES SO OBTAINED

This is a division of application Ser. No. 816,751 filed Jan. 7, 1986 now abandoned.

FIELD AND BACKGROUND OF THE INVENTION

According to the ideas current in the art, the production of glazed ceramic tiles is carried out by one or other of two general processes.

The first of the known production processes provides for forming the ceramic body of the tile in a traditional manner, drying it and then firing it to obtain the so-called biscuit-ware.

By ceramic bodies is here meant any bodies made with batches of natural raw materials such as clay, kaolin, feldspar, wollastonite, talc, calcium carbonate, dolomite etc., or synthetic materials like calcined kaolin (grog), pure oxides (allumina, silica, corundum), with the addition or not of binders to increase the raw mechanical strength.

Such bodies, undergo chemical and structural changes during a heating treatment and acquire substantially new mechanical properties, passing from the low toughness of the raw state to the hard, tough and brittle state after the heat-treatment.

Consequently, in this specification, for "firing of ceramic bodies", it generally means that heating treatment, which causes the above mentioned substantial alteration of the mechanical characteristics of the ceramic bodies by means of chemical reactions, crystalline modification, and components' melting.

The biscuit is then glazed and given a further firing to bring about in the glaze the structural change—strictly dependent on the nature of the components of the glaze—which for the sake of simplicity will hereafter be called vitrification. This term may not be strictly correct for all the glazes used in the ceramic tile-marking industry which, during firing, may melt almost completely or only to a small extent, in this latter case the phenomenon being closer to sinterization.

However, as the firing of glaze on ceramic materials is well-known in the art, such linguistic simplification cannot lead to misunderstanding. By glazed there is here meant any composition adapted to develop under heating a vitreous, transparent or opaque surface, which can be glossy or dull, either in a wholly fritted from, i.e. melted previously, or raw, or in the form of differently composed mixtures.

This process of double-firing, first of the ceramic body and then of the glaze, has advantages but also disadvantages. In the first place, the first firing, the ensuing cooling, and then the second firing to vitrify the glaze represent a process that consumes much thermal energy and much time and calls for apparatus volumes which are large for the volumes of tiles produced.

It might be thought that in double-firing the first firing to produce the biscuit-ware can, if conducted in a workmanlike manner, produce biscuit-ware of optimal characteristics as a result solely of the nature of the starting clay mix; the fact is, however, that the requirements deriving from the subsequent glazing in practice condition the preparation of the biscuit-ware.

The glazes are generally prepared by wet milling, so as to contain for example from 30% to 60% of water.

If dry glazes are employed, a wet treatment is then needed to guarantee adherence to the ceramic body.

When the glazes are applied to biscuit-ware of porous structure, i.e. not vitrified, the plentiful presence of water is not a source of difficulties; for in such conditions the biscuit-ware readily absorbs the water and the glaze therefore adheres well to the body.

But when the biscuit-ware is vitrified, special treatments are necessary before the firing proper of the glaze, in particular a pre-heating to obtain rapid evaporation of the water; nevertheless, if it is wished to obtain an acceptable adherence of the glaze, such treatments prove highly critical and thus represent considerable difficulties as far as the process in question is concerned.

In consequence, the problems involved in glazing vitrified ceramic bodies defeat the apparent freedom to form the ceramic body in an independent manner as in double-firing, since such independent formation will only at the cost of serious complications permit the formation of tiles with vitrified ceramic body having desirable mechanical strength properties.

Because of the problems entailed in the double-firing process, a more recent proposal suggests firing both the clay mix and the glaze in a single operating step—the so called single-firing process. According to this process the raw ceramic bodies are dried, pre-heated and glazed when they are sufficiently hot to allow an evaporation of the water contained in the glaze. However, the pre-heating does not prevent a certain amount of water from being absorbed by the raw clay mix—and moreover in an uneven manner, so that in practice absorption proves greater at the edges of the article since the edges cool more rapidly.

This phenomenon can lead to a fissuring of the article at its edges, thus reducing its strength.

Another intrinsic difficulty of the single-firing process is that it calls for somewhat complex movement of the raw tiles, which have to be glazed in the said condition and the delicacy of which is known.

In the single-firing process the raw glazed tile is then fired in a single cycle up to a temperature that fires both the body mix and the glaze (vitrification of the glaze).

As it requires only one furnace or kiln and only one firing operation, single-firing is clearly an important advance on traditional double-firing: the apparatus can be less extensive, and the thermal energy dispersed between the firing of biscuit-ware and the firing of the glaze is saved.

If the reactions occuring during the firing are sufficiently known, with single-firing it is also possible to obtain nearly all the effects typical of double-firing, although it may appear to be a limitation to have to provide a clay mix firing temperature compatible with the characteristics of the glaze that vitrifies during the same firing, with consequent loss of the operational independence peculiar to double-firing.

However, the greatest difficulty in single-firing is the predisposition of the gases released during the firing of the ceramic body to vitiate the evenness and compactness of the glaze.

The importance of this phenomenon is readily seen if it is recalled that a tile weighing 1 kg formed from a mix containing 10% of calcium carbonate and brought to a temperature of 1000° C. releases a volume of carbon dioxide of about 90 liters.

The gas released from the ceramic body passes through the glaze, in which remain small bubbles which leave it to a certain extent in a porous condition.

Thus, though single-firing obviates the glaze-firing in the case of vitrified ceramic bodies, the former leads to glazes which, even though they have excellent adherence, are of a relatively porous consistency.

It has also been suggested to apply an insulating layer, known as engobe, between glaze and ceramic body in the single-firing process in order to reduce the possibility of interaction between them during firing; but the application of engobe diminishes the satisfactory adherence of the glaze that is characteristic of single-firing.

In short, double-firing gives rise to porous-ceramic body tiles, which thus have lower mechanical strength but an adherent and highly compact glaze, whereas single-firing gives rise to tiles with vitrified ceramic body of high mechanical strength and with a glaze that is satisfactorily adherent, but relatively porous.

SUMMARY OF THE INVENTION

The object of the present invention is to overcome the difficulties of the above mentioned processes for firing tiles, by means of an improved process of glazing and firing of tiles and also an apparatus for carrying out such process.

According to the invention, the improved process for producing a glazed ceramic tile starting from a raw ceramic body comprises the steps of placing the ceramic body in a furnace for a first phase of thermal treatment at the conclusion of which the reactions of firing of the ceramic material are substantially complete, and a second phase of thermal treatment entailing a gradual final cooling, and is characterized in that it includes, between the first and second stage of thermal treatment, a phase of distributing onto said ceramic body, substantially at the final temperature which it had in the first phase of thermal treatment, a loose dry glaze during the initial part of said second phase, the ceramic body being brought to a temperature sufficient for the glaze to vitrify by the melting of at least one component part thereof.

According to the invention, the apparatus for firing and glazing ceramic tiles provides for a firing kiln or furnace into which are placed raw ceramic bodies, comprising a first part of the furnace featuring means for heating the bodies until the reactions of firing the batch are substantially completed, and a second part of the furnace featuring temperature control means for maintaining the tiles at a controlled and decreasing temperature for the gradual cooling of said tiles, and means for progressing the bodies successively along said first and second part of the furnace. The said apparatus is characterized by the fact that between said first and second part of the furnace provision is made for a glazing station equipped with means for transferring the tiles form the output of the first part of the furnace to the input of the second, and with means for spreading loose, dry glaze over the bodies carried by the transferal means.

BRIEF DESCRIPTION OF THE DRAWINGS

The process will now be described in an exemplifying realization thereof with reference to a form of embodiment, also exemplifying, of the firing apparatus according to the invention, illustrated in the appended drawings, in which:

FIG. 1 is a general schematic of apparatus according to the invention;

FIG. 2 illustrates a particular of the apparatus of FIG. 1;

FIG. 3 shows a typical diagram of the temperature existing in the apparatus of FIG. 1;

DESCRIPTION OF THE PREFERRED EMBODIMENT

According to the invention the ceramic bodies, formed according to conventional technologies are conveyed raw, after adequate drying, to the mouth 10 of the firing furnace.

The firing furnace features a first section 11 in which the temperature is progressively scaled-up to a value sufficient to bring the tiles therein moving on suitable known transport organs to a firing temperature, that is to say a temperature at which the reactions of firing of the raw ceramic material can be considered substantially terminated.

At the end of this section 11 of the furnace, the tile conveyor means takes the tiles to a glaze-deposition zone generically indicated by 12.

This zone, which is of particular pertinence in the invention, is shown in FIG. 2. The numeral 13 indicates the exit for the tiles from section 11 of the oven on conveyor means schematically shown as a single layer of rollers 14. The roller conveyor route continues proximally to the zone 12 in which is formed an ambience in which the temperature can be controlled for example by means of registrably openable panels 15 so that the temperature in the zone 12 remains at a pre-set value, which is typically lower than that of the section 11 proximal to its output mouth 13, so as to facilitate the control of the temperature of the tiles.

Provision is made in the zone 12 for a device indicated overall by 20 for the even spreading of a dry glaze in loose form, either as granules or a powder, over the tiles which travel below it conveyed by the rollers 14.

In the interests of a straightforward description of its function and overall structural principles, this device can be considered to consist of a reservoir 21 for the glaze, which is fed to a dispenser 22 which spreads it evenly over the tiles which are conveyed below it, in any number of rows, by the rollers 14.

Below the delivery device 20 provision is made for a collector 23 of the glaze not received by the tiles, in particular the glaze falling into the spaces between the tiles conveyed by the rollers 14. The glaze collected in 23 is advantageously recycled to the reservoir 21.

The schematized structure of the device 20 is given as an indication only, since it can have any known form of embodiment-weir-type, vibrating screen type, spray or other type, there being required of it only a correct and continuous dispensing of glaze in the form of granules or powder onto the tiles conveyed proximally to it.

The means for conveying the tiles into the zone 12 can likewise be of different nature, such means being exemplified in the schematic of FIG. 2 as rollers 14, to such end there being suitable the mechanics known for such purpose in the field of moving clay articles.

The tiles leave the zone 12 and enter the mouth of the inlet 16 to the successive section 17 of the furnace, where they remain at a temperature sufficient for complete vitrification and curing of the glaze and are then cooled in a manner sufficiently gradual to prevent inadmissible inner stresses being set up within them and, lastly, they are discharged from the terminal outlet 18 of the furnace.

Constructional particulars of the furnace are not here described inasmuch as the two sections 11 and 17 are very closely analogous to a traditional furnace, kiln or heating chamber for the firing of ceramic bodies to obtain the biscuit-ware formed in the double-firing process; the said two sections can therefore be constructed using all the teachings that traditional technology has made known in this regard.

In particular, the mouths 10, 13, 16 and 18 of the furnace will be embodied, with constructional artifices per se known in the field, so as to enable a controlled atmosphere to be maintained in each section of the furnace in order to promote the desired reactions during the thermal treatment of the ceramic body and of the glaze.

The solution according to the present invention is based on awareness of the possibility of briefly interrupting the firing of the ceramic body, that is to say the possibility, at least in one phase of the firing, of exposing the ceramic body of a relatively cold ambience, i.e. an ambience the temperature difference of which with respect to the ceramic body is much greater that that inside the furnace during the phase of firing and cooling the ceramic body.

It has in effect been found that the heat shock undergone by the tile as a result of exposure to such ambience is tolerated without problems by the material if it remains in any case in a plastic behavioural condition and not in a brittle condition. Such plastic condition occurs when the ceramic body is in the incandescent state, i.e. at a temperature of not less than approximately 700° C., for the vast majority of the body mixes currently employed for producing ceramic tiles.

According to the invention, the temperature in the zone 12 is maintained at a value such as not to cause an overheating of the glazed distributor device 20 such as causes a melting or in any case a thickening of the glaze contained therein; this means that such devices do not become obstructed and that there are no unevennesses of distribution of the glaze over the tiles.

It is also advisable for there to be at relatively low temperature in the entire zone in which the glaze is distributed in order to prevent the glaze falling onto the tiles from being sublimated, with consequent dispersion into the ambience and soiling of the furnace and the device contained therein.

The tiles reaching the zone 12 are incandescent, at the temperature they had during firing in the terminal part of zone 11 of the furnace: such temperature is not necessarily the maximum temperature that the tiles reach in the firing furnace 11.

When the vitrification temperature of the glaze is lower than the firing temperature, it is in fact useful for the tiles to start on a cooling phase in the terminal zone 11 of the said furnace such as leads the tiles to reach the glaze distributor device at the most suitable temperature, account being taken also of the decrease in temperature they can undergo in the zone 12.

Thus, in practice, the control of the temperature of the tiles when they receive the glaze can be effected by regulating the temperature at which they leave section 11 of the furnace, taking into account the lowering of temperature which they can undergo in the zone 12. There is another possibility of controlling this last-mentioned temperature decrease and that is by acting also on the temperature which is maintained in the zone 12, provided, as has previously been stated, that such temperature does not become such as to cause physical or chemical alterations to the powdered glaze which is disributed over the incandescent tiles.

As well as the deposition of the glaze, another operation connected with the decoration of the tiles can if wished be performed in the zone 12, such as the placing of transfers at a high temperature for creating decorations calling for a particular distribution of the colorant forming the decoration. The transfer can be placed on the tiles by robotized manipulators.

The glaze deposed on the tile reaches its maximum temperature and minimum viscosity precisely at the contact surface with the ceramic body, thus promoting adherence to such body.

The fact that the stay time of the tiles in the zone 12 necessary for them to receive the glaze is short, prevents them from passing from the incandescent plastic state to the brittle state—in which the thermal shock can set up inner stresses such as fissure the clay material.

The deposition of the glaze as a loose powder makes the amount of glaze adhering to the vertical sides of the tile negligible and practically nil, and thus the tile is clean at the edges which in turn diminishes the peripheral brittleness of the glaze coating and the resulting possibility of its chipping away.

Should it be wished to apply more than one glaze, each calling for a certain temperature of the ceramic body for its application, and a subsequent temperature for curing other glazing stations can be provided for at the part 17 of the furnace in the terminal part of which the tiles are gradually cooled.

The characteristics of the process according to the invention will become more apparent from an examination of the following description of some forms of embodiment thereof.

EXAMPLE 1

Production of wall tiles having the following characteristics:
Size: 15×20 cm
Thickness: 7 mm
Porosity: 12%
Modulus of rupture: 200 kg/cm$^2$
Glossy glaze with blue grit type effect.
Characteristics of mix:
Mixture of natural sand and clays in the following proportions:
Maiolica clay: 60%
Grès clay: 25%
Feldspar sand: 15%
(Table 1 hereafter gives the compositions).
Mix prepared by dry milling on a pendulum-grinder mill and wetting to 5% humidity.
Forming by dry pressing with hydraulic presses, at a specific pressure of 220 kg/cm$^2$ with 5-way die.
Direct placement in rows of 8 juxtaposed on the 20-cm face into a single layer roller kiln having the following characteristics:
Dryer length: 13820 mm
Pre-heating and firing: 24747 mm
Chamber width: 1465 mm
Max. firing temperature: 1060° C.
Duration of cycle: 25 minutes approx.
FIG. 3 shows the firing curve, with the furnace fume temperature on the ordinate and times on the abscissa, proportionally correlated with the longitudinal dimensions of the furnace in relation to the conveyance speed of the files in it.
Glazing:
Glaze composed of a mixture of three frits (composition given in Table 1).

Frit 1: 70%
Frit 2: 20%
Frit 3: 10%
Particle size between 0.2 and 1 mm
Vitrification temperature = 950° C.
Glazing with roller dispenser
Length of glazing zone: 1000 mm
Application of 30 g of glaze per tile
Transit time: 30 seconds.

When they have travelled through the glazing zone the tiles, still at approximately 900° C., enter the second furnace-section 17 which has the following characteristics:

Length: 23311 mm
Width: 1465 mm

This section is maintained in its initial zone at 1000° C. and the tiles travel through it in about 4 minutes, which is sufficient for the complete curing of the glaze.

Following the aforesaid section is the direct and indirect tile cooling zone.

The total length of the machine is therefore 62878 mm, with a total tile treatment cycle of 40 minutes.

EXAMPLE 2

Production of floor tiles having the following characteristics:
Size: 25 = 25 cm
Thickness: 8 mm Max. temperature: 1150° C.
Duration of cycle: 30 minutes.

The firing curve relative to the temperature of the fumes will be similar in its general course to the curve of FIG. 3, with different values on the ordinate and abscissa.

Glazing

Glaze composed of a single frit, of particle size between 0.2 and 1 mm.
Vitrification temperature = 1050° C.

The composition of the Frit is as indicated in Table 1 (Frit 4).

Glazing with roller dispenser
Length of glazing zone: 1500 mm
Application of 45 g of glaze per tile.
Transit time: 30 seconds.

After travelling through the glazing zone, the tiles, still at about 1000° C., enter the second section of the furnace, which has characteristics as follows:

Length: 22628 mm
Chamber width: 1465 mm
Maintained at a temperature of 1100° C.

The tiles pass through the first zone of the section maintained at 1100° C. in about 4 minutes, which is sufficient for the curing of the glaze, and then pass through the direct and indirect cooling zone.

The total length of the machine is thus 76695 mm, with a total cycle duration of 50 minutes.

TABLE 1

| | Maiolica clay | Gres clay | Feldspar sand | Feldspar | Clay 1 | Clay 2 | Frit 1 | Frit 2 | Frit 3 | Frit 4 |
|---|---|---|---|---|---|---|---|---|---|---|
| | | | | CHEMICAL COMPOSITIONS | | | | | | |
| $SiO_2$ | 55.3 | 61.6 | 81.0 | 76.4 | 73.5 | 64.8 | 36.5 | 50.2 | 43.3 | 65.0 |
| $Al_2O_3$ | 14.8 | 20.3 | 9.4 | 13.4 | 22.5 | 28.5 | 5.0 | 5.0 | 5.5 | 5.6 |
| $Fe_2O_3$ | 6.0 | 8.0 | 0.9 | 0.7 | 1.1 | 1.8 | 0.2 | | | 0.1 |
| $TiO_2$ | 0.8 | 1.1 | 1.1 | | 1.7 | 1.7 | 0.1 | 9.5 | | 6.0 |
| CaO | 14.7 | 0.6 | 2.8 | 1.0 | 0.3 | 0.3 | 4.4 | | 7.5 | 7.5 |
| MgO | 3.2 | 2.3 | 0.3 | 0.3 | | 0.2 | 0.3 | 1.5 | 3.0 | 0.1 |
| $K_2O$ | 3.1 | 3.8 | 3.4 | 5.9 | 0.6 | 2.1 | 0.6 | 0.5 | | 0.8 |
| $Na_2O$ | 1.2 | 1.6 | 2.1 | 0.8 | 0.1 | 0.2 | 0.7 | 5.1 | 3.5 | 4.0 |
| ZnO | | | | | | | 4.5 | 3.2 | 2.0 | |
| BaO | | | | | | | | 6.1 | | |
| CoO | | | | | | | | | 10.0 | |
| PbO | | | | | | | 34.6 | 8.8 | | |
| $ZrO_2$ | | | | | | | 5.4 | | | |
| $B_2O_3$ | | | | | | | 5.0 | 10.4 | 25.3 | 10.1 |
| $Li_2O$ | | | | | | | | | | 0.3 |
| L.O.I. | 14.6 | 6.0 | 2.7 | 2.3 | 7.8 | 8.4 | | | | |
| $CaCO_3$ | 22.3 | 0.3 | 4.1 | | | | | | | |

Porosity: 3%
Semi-mat, light-beige glaze
Characteristics of mix:
Mixture of clays and feldspar in the following proportions:
Feldspar: 45%
Clay 1: 30%
Clay 2: 25%
(compositions given in Table 1).
Mix prepared by wet milling with 35% of water and atomization.
Atomized humidity: 5%
Forming by dry pressing with hydraulic presses at a specific pressure of 300 kg/cm², and 3-way die.
Direct placement in rows of 5 into a single layer roller kiln having the underlisted characteristics:
Dryer length: 14548 mm
Pre-heating and firing: 32102 mm
Roller diameter: 32 cm for the last 12700 mm
Width: 1465 mm The process according to the invention therefore leads to the following advantages compared to the known prior technologies:

elimination of all movement of the raw tiles, apart from their placement in the furnace, thus avoiding breakage and chipping.

simplification of the productive process, with, if desired, elimination of all the structures normally necessary for storing the raw tiles, given that the furnace can be fed continuously and directly from the forming section;

reduction of energy consumption for drying, in that there is no glazing water partially absorbed by the raw tiles;

greater freedom in designing the markings and embossings on the upper and back side of the tiles, in that there are no problems of differentiated dryings arising from different thicknesses or different porosities proximally to the back reliefs;

the entire furnace, fed with unglazed tiles, remains clean and thus requires less maintenance;

the ceramic body, fired without glaze, is free to degas and can more readily oxidize;

the firing process is promoted and can be effected in shorter times;

use can be made of less pure clays with higher firing loss;

the use of engobes is totally unnecessary;

the ceramic body firing temperature is unrelated to that of the glaze, which can in any case vary. The glaze is therefore fired in the conditions most suitable for obtaining perfect adherence and total absence of porosity in that it is applied when the reactions of the ceramic body are complete, this making the use of engobes superfluous;

it is possible to apply special glazes which decompose at the temperatures at which the ceramic body is fired, thus broadening the range of products that can be obtained;

the glaze adheres solely to the surface of the tile;

excess glaze can be readily recycled, after collection in a hopper;

several successive depositions of glazes can be made, thus obtaining multiple effects;

as the section of the oven downstream of the glazing section is physically separate from the furnace for firing the ceramic body, particular atmospheres can be created and controlled in it (oxidizing, reducing or inert atmospheres) without this in any way altering the characteristics of the mix firing cycle. There is in this way achieved a greater freedom in realizing special effects obtainable in a controlled atmosphere, which is very difficult to achieve using traditional technologies;

it is possible to obtain, much more economically, products with vitrified ceramic bodies, i.e. with high mechanical strength, with totally non-porous glazes, that is to say intrinsically resistant to wear and with excellent adherence properties and therefore also having very high impact strength;

the range of products that can be used for glazing is considerably broadened, it being possible to use low-melting glazes on vitrified ceramic bodies fired at higher temperatures, or glazes requiring very short firing cycles which are impossible with traditional technologies.

I claim:

1. An apparatus for firing and glazing clay tiles, comprising a firing furnace having a first section with a first inlet mouth for receiving dried raw clay tile, means in said first section for gradually heating raw tiles as they pass through said first section to a temperature sufficient for substantially completing firing reactions in the clay tile and for raising the temperature of the tiles to an incandescent plastic temperature, said first section having a first exit mouth for discharging the tile at the incandescent plastic temperature, a glazing section for receiving fired tiles at the incandescent plastic temperature directly from said first exit mouth, means in said glazing station for permitting an abrupt drop in temperature of said fired tiles to a temperature below a vitrification temperature of a dry loose glaze, glaze spreading means in said glazing station for spreading dry loose glaze on the fired tile in said glazing station, said firing furnace having a second station with a second inlet mouth for receiving glaze covered tiles from said glazing station, means in said second section for maintaining tiles in said second section at an initial temperature sufficient for vitrifying the glaze on the tiles and for providing a subsequent controlled and decreasing temperature for the progressive cooling of the tiles in said second section, said second section having a second exit mouth for discharging glazed, fired and cooled tiles, and conveying means extending in a single pathway through said first section, said glazing station and said second station, and past said first and second inlet and said first and second exit mouths, for conveying tiles from said first inlet mouth to said second mouth so that raw tiles are fired and glazed in a continuous process.

2. An apparatus according to claim 1, characterized in that said glaze spreading means are contained within an ambience equipped with temperature regulation means for maintaining the temperature of the ambience at a value lower than that at which the glaze undergoes vitrification and physical and chemical alteration.

3. An apparatus according to claim 1, characterized in that the means for spreading glaze on the ceramic bodies comprises a glaze distribution device operating over the entire width of the tile conveyor means.

4. An apparatus according to claim 3, characterized in that said conveyor means form a discontinuous support surface for the files spaced one from the next and supported at a number of points, the distribution device deposing the glaze over the entire width of the conveyor means and a collector for collecting the glaze falling between the spaced-apart tiles.

5. An apparatus according to claim 4, wherein said conveyor means comprises a single layer of rollers.

* * * * *